United States Patent [19]
Guthrie et al.

[11] Patent Number: 6,058,374
[45] Date of Patent: May 2, 2000

[54] INVENTORYING METHOD AND SYSTEM FOR MONITORING ITEMS USING TAGS

[75] Inventors: Warren E. Guthrie, GlenEllyn; Kenneth D. Gorham, Palatine, both of Ill.

[73] Assignee: Northrop Grumman Corporation, Los Angeles, Calif.

[21] Appl. No.: 08/667,896

[22] Filed: Jun. 20, 1996

[51] Int. Cl.$^7$ ................................................. G06F 17/60
[52] U.S. Cl. ............................................................ 705/28
[58] Field of Search .................................... 340/573, 574, 340/539, 825.14, 825.49, 825.34, 825.31, 825.35, 572, 825.69; 235/375, 385, 382, 380; 342/42, 44; 705/24, 28

[56] References Cited

U.S. PATENT DOCUMENTS

| | | | |
|---|---|---|---|
| 3,163,856 | 12/1964 | Kirby | 340/571 |
| 4,101,872 | 7/1978 | Pappas | 340/539 |
| 4,367,458 | 1/1983 | Hackett | 340/539 |
| 4,593,273 | 6/1986 | Narcisse | 340/539 |
| 4,611,198 | 9/1986 | Levinson et al. | 340/539 |
| 4,636,950 | 1/1987 | Caswell et al. | 364/403 |
| 4,656,463 | 4/1987 | Anders et al. | 340/572 |
| 4,675,656 | 6/1987 | Narcisse | 340/539 |
| 4,710,751 | 12/1987 | Webster | 340/522 |
| 4,734,680 | 3/1988 | Gehman et al. | 340/539 |
| 4,747,120 | 5/1988 | Foley | 379/38 |
| 4,814,751 | 3/1989 | Hawkins et al. | 340/573 |
| 4,853,692 | 8/1989 | Wolk et al. | 340/573 |
| 4,857,893 | 8/1989 | Carroll | 340/572 |
| 4,862,160 | 8/1989 | Ekchian et al. | 340/825.54 |
| 4,885,571 | 12/1989 | Pauley et al. | 340/573 |
| 4,899,135 | 2/1990 | Ghahariiran | 340/573 |
| 4,918,432 | 4/1990 | Pauley | 340/573 |
| 4,931,788 | 6/1990 | Creswick | 340/825.54 |
| 4,952,913 | 8/1990 | Pauley et al. | 340/573 |
| 4,952,928 | 8/1990 | Carroll et al. | 340/825.54 |
| 4,975,681 | 12/1990 | Watkins et al. | 340/572 |
| 4,998,095 | 3/1991 | Shields | 340/574 |
| 5,014,040 | 5/1991 | Weaver et al. | 340/572 |
| 5,021,794 | 6/1991 | Lawrence | 340/573 X |
| 5,028,918 | 7/1991 | Giles et al. | 340/825.54 |
| 5,032,823 | 7/1991 | Bower et al. | 340/568 |
| 5,047,750 | 9/1991 | Hector | 340/573 |
| 5,075,670 | 12/1991 | Bower et al. | 340/573 |
| 5,079,541 | 1/1992 | Moody | 340/573 |
| 5,113,349 | 5/1992 | Nakamura et al. | 364/478 |
| 5,115,223 | 5/1992 | Moody | 340/573 |
| 5,115,224 | 5/1992 | Kostusiak et al. | 340/574 |
| 5,153,583 | 10/1992 | Murdoch | 340/825.54 |
| 5,182,543 | 1/1993 | Siegel et al. | 340/531 |
| 5,189,395 | 2/1993 | Mitchell | 340/539 |

(List continued on next page.)

*Primary Examiner*—Emanuel Todd Voeltz
*Assistant Examiner*—Alexander Kalinowski
*Attorney, Agent, or Firm*—Terry J. Anderson; Karl J. Hoch, Jr.

[57] ABSTRACT

A method for accounting for individual ones of a plurality of items based upon random times that occur as a function of a first specified time interval, and a random interval inventory system that operates in accordance with the method. The method includes a first step of transmitting information signals based upon random times from individual ones of a plurality of tags ($5a1$–$5xx$) to at least one of at least one master transceiver and at least one transceiver ($4a$–$4n$). The individual tags ($5a1$–$5xx$) are affixed to respective individual ones of a plurality of items. The information signals transmitted from each tag ($5a1$–$5xx$) correspond at least to the respective item to which the tag ($5a1$–$5xx$) is affixed. The random times occur as a function of a first specified time interval. For a case wherein the information signals are transmitted to the at least one remote transceiver, each at least one remote transceiver ($4a$–$4n$) receives information signals from at least one of the tags ($4a$–$4n$), and in response to receiving each information signal, relays the signal to the master transceiver (3). In response to the master transceiver (3) receiving an information signal, a next step includes supplying the signal to an associated confirmation device (2). Within the confirmation device (2), in response to receiving an information signal from the master transceiver (3), a next step includes confirming that the item corresponding to the information signal is accounted for.

20 Claims, 11 Drawing Sheets

U.S. PATENT DOCUMENTS

| | | | |
|---|---|---|---|
| 5,204,670 | 4/1993 | Stinton | 340/825.54 |
| 5,218,344 | 6/1993 | Ricketts | 340/573 |
| 5,231,273 | 7/1993 | Caswell et al. | 235/385 |
| 5,266,926 | 11/1993 | Biegel | 340/572 |
| 5,289,163 | 2/1994 | Perez et al. | 340/539 |
| 5,317,309 | 5/1994 | Vercellotti et al. | 340/825.54 |
| 5,347,263 | 9/1994 | Carroll et al. | 340/572 |
| 5,363,425 | 11/1994 | Mufti et al. | 379/38 |
| 5,365,185 | 11/1994 | Bar-David | 329/308 |
| 5,365,516 | 11/1994 | Jandrell | 370/335 |
| 5,386,435 | 1/1995 | Cooper et al. | 375/1 |
| 5,394,435 | 2/1995 | Weerackody | 375/206 |
| 5,416,468 | 5/1995 | Baumann | 340/573 |
| 5,422,626 | 6/1995 | Fish | 340/539 |
| 5,426,425 | 6/1995 | Conrad et al. | 340/825.49 |
| 5,440,295 | 8/1995 | Ciecwisz et al. | 340/573 |
| 5,448,221 | 9/1995 | Weller | 340/539 |
| 5,491,468 | 2/1996 | Everett et al. | 340/572 |
| 5,576,689 | 11/1996 | Queen | 340/514 |
| 5,589,821 | 12/1996 | Sallen et al. | 340/573 |
| 5,617,074 | 4/1997 | White | 340/573 |

INVENTORYING METHOD AND SYSTEM FOR MONITORING ITEMS USING TAGS

FIELD OF THE INVENTION

This invention relates generally to inventory systems and to telemetering. In particular, this invention relates to a system that accounts for items based upon signals transmitted at random time intervals.

BACKGROUND OF THE INVENTION

It is known in the art to provide an identification system using transponders communicating with an identification receiver. For example, U.S. Pat. No. 5,491,468, issued to Everett et al., discloses a portable tag which receives energy from a reading device via magnetic coupling for charging a storage capacitor. A discharge of the capacitor powers a coded information transmission circuit during a small percentage of the duty cycle. Transmissions are made from the portable tag to the reading device.

It is also known in the art to provide an identification system using transponders communicating with an identification receiver to reduce the probability that more than one transponder simultaneously transmits to the receiver at a same frequency. U.S. Pat. No. 5,302,954, issued to Brooks et al., and U.S. Pat. No. 5,153,583, issued to Murdoch, disclose a base station for applying a magnetic field to a plurality of transponders. Each of the transponders extracts energy from the magnetic field. The energy extracted by individual ones of the transponders enables the individual transponders to transmit identification codes and/or specially stored or other information to be identified by a base station receiver.

The transponders can generate one or more carrier frequencies from an available set of carrier frequencies. As such, many transponders simultaneously transmitting to the base station may be identified under conditions where co-interference would normally preclude correct identification. An idle state, during which individual ones of the transponders do not transmit signals, is employed to reduce the probability that more than one transponder will transmit signals at the same frequency, thereby ensuring that correct identification of a transmitting transponder is made. Signals which may have been corrupted or co-interfered with can be ignored by the receiver. Each transponder can sequentially transmit an identifying code on a randomly selected frequency that is selected from an available set of carrier frequencies.

The use of an idle state and randomly selected frequencies may reduce the probability that more than one transponder will transmit signals of a same frequency at a same time. However, the degree of reduction attainable by these techniques is still limited because, for example, there are typically a restricted number of frequency bands available owing to finite receiver and/or transmitter bandwidths.

OBJECTS OF THE INVENTION

It is a first object of this invention to provide a method and apparatus for increasing a probability that individual ones of a plurality of transponders will successfully transmit signals to a receiver.

It is a second object of this invention to provide a method and apparatus for accounting for individual ones of a plurality of items based upon random times that occur as a function of a specified time interval.

It is a third object of this invention to provide a method and apparatus for sensing an occurrence of a specified event occurring to any one of a plurality of items, and in response thereto, reporting the detection of the occurrence of the specified event to a user.

It is a fourth object of this invention to provide at least one transmitter tag that initiates communication with at least one of a master transceiver and a transceiver in order to provide an inventorying of at least one item.

Further objects and advantages of this invention will become apparent from a consideration of the drawings and ensuing description.

SUMMARY OF THE INVENTION

The foregoing and other problems are overcome and the objects of the invention are realized by a method for accounting for individual ones of a plurality of items based upon random times, and by a random interval inventory transceiver system that operates in accordance with the method. The method includes a first step of transmitting information signals at random times from a plurality of individual transmitters (hereinafter also referred to as "tags") to at least one transceiver. The random times occur as a function of a specified first time interval. The first time interval may be programmed by, for example, a user operating a user interface to enter information into a controller of one of the transmitters for specifying an average time interval (i.e., the first time interval). As such, the programmed transmitter transmits information signals at the random times, chronologically occurring ones of which are temporally spaced by intervals having varying durations that are a function of the first specified time interval. In this manner, a general average frequency (e.g., every 5 minutes) with which a routine inventorying of an item is performed can be specified.

Individual ones of the transmitters are affixed to respective individual ones of a plurality of items to be inventoried. The information signals transmitted from the individual ones of the plurality of transmitters correspond to the respective individual ones of the plurality of items to which the transmitters are affixed. By example, an information signal corresponding to one of the items represents information identifying the item.

Each at least one transceiver receives information signals from at least one of the plurality of transmitters. In accordance with one embodiment of the invention, in response to receiving an information signal at each at least one transceiver, a next step includes relaying the signal from the transceiver to at least one master transceiver. The master transceiver thereafter provides the signal to an associated security station. The security station has information stored within corresponding to each of the information signals transmitted by the plurality of transmitters, and hence corresponding to each of the plurality of items. A next step includes, within the security station, determining that the information signal received from the master transceiver corresponds to at least a portion of the information stored within the security station. Upon such a determination, a next step includes confirming that the item corresponding to the received information signal is accounted for. In this manner a routine inventorying is performed of each item based upon random times that are a function of the first specified time interval. While performing the inventory, the system is deemed to be operating in a confidence mode.

In accordance with the method of this invention, individual ones of the random times occur randomly during respective individual ones of sequentially occurring predetermined time intervals.

Further in accordance with the method of this invention, the at least one transceiver receives information signals from at least one of the plurality of transmitters depending upon, at least in part, a position of the transceiver relative to that of the at least one of the plurality of transmitters. By example, one transceiver may be located within a same room as a number of the transmitters in order to relay, and thus facilitate, the communication of information signals from the transmitters to a master transceiver. For a case in which at least one of the transmitters is positioned such that it can effectively communicate information signals directly to the master transceiver without a need for relaying the signals to a transceiver, no relaying transceiver is employed. In such a case, the information signals are communicated directly to the master transceiver, which thereafter provides the signals to the associated security station wherein the step of confirming is performed in the manner as described above.

The invention can also operate in a so called "panic" operating mode, wherein an occurrence of a specified condition (e.g., movement or a temperature condition) affecting any of the plurality of items is detected and ultimately reported to the security station and to a user for verification of the detection. In accordance with this mode of the invention, a sensor coupled to a tag that is affixed to an affected one of the items detects an occurrence of the specified event. In response to the detection of the occurrence of the specified event, the tag transmits information signals ("distress alarm signals") to one of the transceivers at random times occurring as a function of a second specified time interval. The second time interval can be specified in a manner that is similar to that described above for the specification of the first time interval. Chronological transmissions of the information signals based upon the second specified time interval are temporally separated as a function of the second time interval, thereby indicating the detection of the specified event occurring to the affected item. Such transmissions during the panic mode occur, by example, at a rate (e.g., every 10 seconds) that is greater than that of transmissions made by the tag during the confidence (routine inventory) mode. Such an increase in the rate of transmission of information signals is ultimately recognized by the security station. As such, the station, and ultimately a user, are notified of the occurrence of the specified condition affecting the item. In one embodiment of the invention, the panic mode may also be implemented by a user operating a "panic alarm" button associated with one of the tags.

In accordance with a preferred embodiment of the invention, in addition to the random transmissions, each tag also transmits signals using a direct sequence spread spectrum technique.

In another embodiment of the invention, the remote transceivers autonomously perform data reduction by identifying what information needs to be communicated to the master transceiver (e.g., what has changed in the inventory or alarm status). The master transceiver transmits commands to the remote transceivers in order to interrogate them for sending back inventory and alarm status signals. In this manner, information provided from the remote transceivers to the master transceiver relates to changes in inventory or alarm status, as opposed to a complete inventory status.

In accordance with the method of the invention, each individual one of a plurality of tags transmits information signals independently from other ones of the plurality of tags, thereby limiting the probability that the at least one master transceiver will receive more than one information signal simultaneously.

In a further embodiment of the invention, a receive/transmit (RX/TX) tag is provided. The RX/TX tag comprises a transmitter portion and a receiver portion. The RX/TX tag transmits signals at random times occurring as a function of a specified time interval in the same manner as described above. However, the transmitter portion is turned off after a first one of the signals is transmitted, and thereafter the receiver portion is turned on for a predetermined time period. After the predetermined time period has expired, the transmitter portion is turned on again for transmitting a second one of the signals. For this embodiment of the invention, a transceiver which receives the first one of the signals transmitted from the RX/TX tag responds by measuring the frequency of the received signal and by transmitting a response signal to the RX/TX tag on a frequency that is offset by a fixed amount from the measured frequency. The transceiver transmits the response signal in a manner such that the response signal is received by said RX/TX tag within the predetermined time period.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
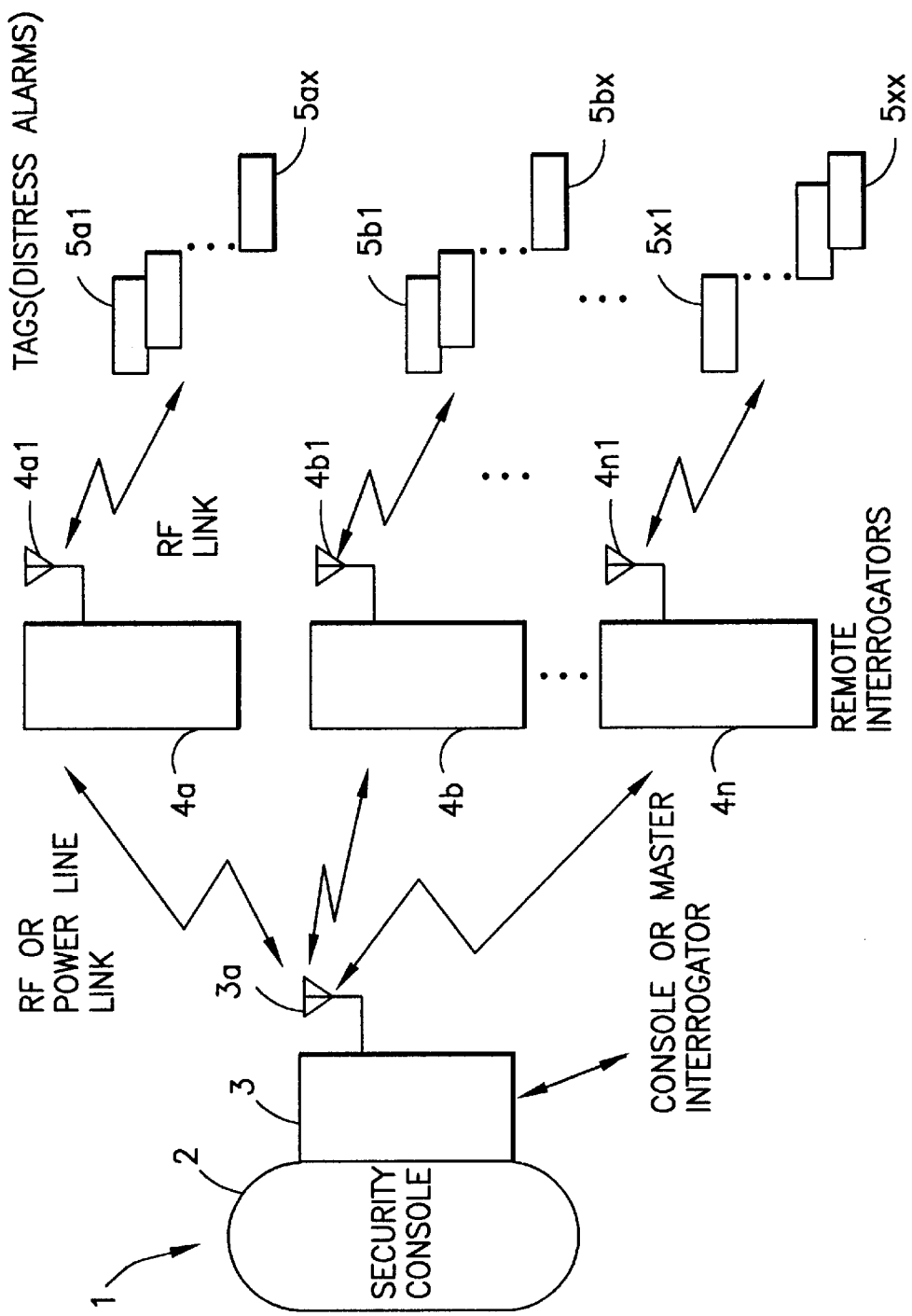
FIG. 1 is a diagram of a random interval inventory system that is constructed in accordance with this invention.

FIG. 1 illustrates one embodiment of a random interval inventory system 1 (hereinafter also referred to as "RIIS") that is constructed in accordance with this invention. The system comprises at least one console (hereinafter also referred to as a "master transceiver") 3 and a plurality of transmitters (hereinafter also referred to as "tags", "transmit-only tags", or "TXs") 5a1–5xx. In accordance with the embodiment of the invention illustrated in FIG. 1, the RIIS 1 also comprises at least one remote transceiver (hereinafter also referred to as a "transceiver") 4a–4n, and at least one security station (confirmation device), which is, by example, a security console 2. In certain other embodiments of the invention, which will be described below, the at least one remote transceiver 4a–4n is not utilized, and the security console 2 is replaced with another suitable device. These components may thus be considered as optional.

For the purposes of clarity, the ensuing description is made in a context wherein a plurality of transceivers, one security console 2, and one master transceiver 3 are being employed, as is illustrated in FIG. 1. The master transceiver 3 is associated with the security console 2, and can be, by example, mounted thereon. The security console 2 stores inventory information corresponding to each of the plurality of tags 5a1–5xx, as will be described below. The master transceiver 3 has an antenna 3a; each of the remote transceivers 4a–4n has an antenna 4a1–4n1, respectively; and, referring to FIG. 2, each tag 5a1–5xx has a respective antenna 22.

It should be noted that although the ensuing description discusses the RIIS 1 in the context of an application for inventorying paintings in an art gallery, it is not intended that the invention be so limited. For instance, the invention may also be employed in other inventory control maintenance applications wherein it is necessary to inventory items such as, by example, laboratory test equipment, or hazardous (e.g., radioactive, poisonous, explosive) materials. Also, the RIIS 1 may be employed to perform inventory and/or person location tracking in defined areas such as, by example, hospitals, laboratory complexes, etc. In addition, the RIIS 1 may be employed in security applications to monitor, by example, infant security in hospitals, the opening/closing of doors and windows, or to determine the entrancing or exiting of a particular item from a home or industrial building. Moreover, the RIIS 1 may be employed to perform remote meter reading (gas, water, electric, etc.), access control, in-building two-way paging, prisoner monitoring, industrial and process control, and control of lighting, heating, and other utilities in buildings.

As mentioned above, in an exemplary application the RIIS 1 may be employed in an art gallery to maintain routine inventory control over paintings that are located within various rooms of an art gallery. For this example, the invention is embodied as follows. Each of the paintings (not illustrated) is associated with a respective one of the tags 5a1–5xx (e.g., each painting has a respective one of the tags 5a1–5xx mounted thereon). In a preferred embodiment of the invention, each individual tag (e.g, tag 5a1) is mounted on a portion of a respective one of the painting's frame in a manner such that, depending upon the tag's effective transmission range and relative location within the art gallery with respect to the locations of the master transceiver 3 and the remote transceivers 4a–4n, the tag 5a is able to communicate effectively with at least one of the master transceiver 3 and one remote transceiver (e.g., remote transceiver 4a), as will be described below.

Each of the tags 5a1–5xx operates in a first operating mode and a second operating mode. The first operating mode, which, for the purposes of this description is also deemed to be a confidence mode, is the operating mode during which regular inventorying is performed of the items (e.g., paintings) to which the tags 5a1–5xx are mounted. While operating in the confidence mode, each individual tag 5a1–5xx independently communicates RF energy (e.g., confidence signals) over its antenna 22 to one of the remote transceivers (e.g., transceiver 4a) at random time intervals (to be described below). In a preferred embodiment of the invention for the transmit-only tags, the tags 5a1–5xx employ Direct Sequence Spread Spectrum (DSSS), for transmitting signals. The second operating mode is discussed below.

Each of the confidence signals transmitted by an individual tag (e.g., tag 5a1) represents bits of information corresponding to the tag 5a1, and hence to the particular painting to which the tag 5a1 is mounted. The information may represent, by example, information (e.g., a serial number) identifying the particular painting. This information corresponds to information stored within the security console 2, and may be programmed into the controller 10 of a tag via an external user interface 13 (see FIG. 2).

Figure 2:
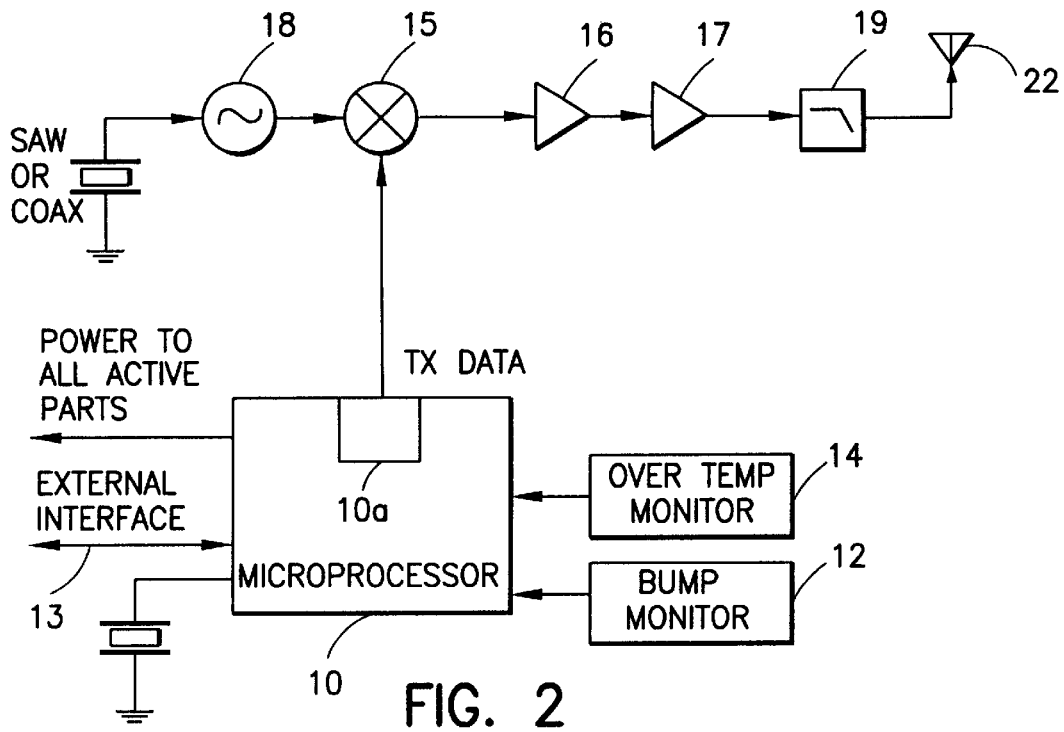
FIG. 2 illustrates a block diagram of a transmit-only tag that is constructed in accordance with one embodiment of the random interval inventory system of FIG. 1.

FIG. 2 illustrates a block diagram of a transmit-only tag (e.g., tag 5a1) constructed in accordance with a first and a second embodiment of this invention. A microprocessor controller 10 having a clock 10a emits control signals at random times that are determined by the clock 10a in a manner that will be described below. Each control signal emitted by the controller 10 is provided to a modulator 15, wherein the signal is mixed with a carrier signal generated by a local oscillator 18. Thereafter, the signal is amplified to an appropriate amplitude by an amplifier 16. The amplifier 17 shown in FIG. 2 is employed in the second (Personal Distress Alarm) embodiment of the invention, which will be discussed further below. Amplifier 17 does not necessarily need to be employed in the transmit-only tags of the first embodiment.

Thereafter, the signal is filtered by filter 19, and transmitted as a confidence signal over the antenna 22 to the master transceiver 3 or one of the remote transceivers 4a–4n. Each tag 5a1–5xx has an effective transmission range of, by example, at least 200 meters, and has a relatively low effective radiated power (ERP). Also, in a preferred embodiment of the invention, each tag 5a1–5xx transmits signals on a fixed frequency of, by example, 2.414 GHz.

In accordance with a preferred embodiment of the invention, antenna 22 for the individual tags 5a1–5xx is small in size and has an ability to radiate energy efficiently in a ground plane and/or in free space. By example, for an operating frequency of 2.414 GHz, the size of the antenna 22 is approximately 1 inch×1 inch, with a thickness of 0.050 inches.

In a preferred embodiment of this invention, the confidence signal is a relatively short duration (e.g., 10 to 100 ms) pulse signal. The generation of such short pulse signals allows each tag 5a1–5xx to use relatively small amounts of energy over time, and therefore preserves the energy of a power supply, such as a battery (not illustrated).

Figure 4A:
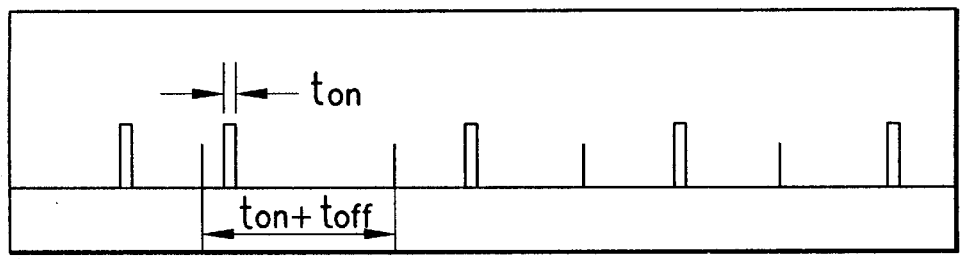
FIG. 4a is an illustration of sequentially occurring average time intervals, during each of which occurs a random time slot at which the tag of FIG. 2 transmits a signal.

In a preferred embodiment of the invention, the transmission times are produced truly randomly by employing "external" signals to "seed" a pseudo-random number generator (located within the controller 10) such as, by example, a binary shift register sequence generator, or another means known in the art for producing a pseudo-random sequence. First, in accordance with one of the techniques for generating a pseudo-random sequence, a period (e.g., 5 minutes, or 60 minutes) is specified by, for example, a user entering appropriate initialization data (e.g., a seed) into the controller 10 via the external user interface 13. This period is deemed to be, for the purposes of this description, a first average time interval. Second, "external" signals are supplied to the controller 10 in response to, by example, detections of events (e.g., "bumps", the reaching of a specified temperature, or the reaching of specified local battery voltage) made by at least one sensor (see below for a discussion of sensors 12 and 14). The controller 10 then determines a temporal separation between, for example, two of the "external" signals supplied from the sensor, and uses this determined temporal spacing to "seed" the pseudo-random sequence generator. Based upon the first average time interval and the "seeding" of the pseudo-random number generator via the "external" signals, the controller 10 then emits control signals at random times, individual ones of which occur randomly during respective individual ones of sequentially occurring time intervals having durations equal to the first average time interval. In this manner, the applicable tag (e.g., tag 5a1) transmits confidence signals at random times, thereby enabling routine inventory checks (e.g., occurring approximately every 5 minutes, or every 60 minutes) of the painting to which the tag 5a1 is affixed to be performed. FIG. 4a illustrates an example of the sequentially occurring time intervals, during each of which occurs a random time slot designated as <u>ton</u> (time-on). For the purposes of this description, the random times associated with the confidence mode are designated as "first random times".

Each remote transceiver 4a–4n functions as a communication relay to enable effective indirect communication between the master transceiver 3 and at least one tag 5a1–5xx for cases in which, by example, the master transceiver 3 is not located within the effective transmission range of a tag (e.g., tag 5a1). For example, for the case in which a tag 5a1 is mounted on a painting located within a room of the art gallery such that the tag 5a1 cannot otherwise effectively communicate directly with the master transceiver 3, a remote transceiver (e.g., remote transceiver 4a) is employed to facilitate such communication. For this example, the remote transceiver 4a is positioned with respect to the tag 5a1 and master transceiver 3 in a manner such that it can relay signals from the tag 5a1 to the master transceiver 3. The remote transceiver 4a may be mounted near the entrance of the room where the tag 5a1 of interest is located, for example. This remote transceiver 4a may also serve to relay communications from other tags (e.g., tags 5a2–5ax) that are located within the same room, to the master transceiver 3.

In some cases, a single remote transceiver 4a may not be adequate to facilitate communications between the tag 5a1 and the master transceiver 3. In such cases additional remote transceivers 4b–4n may be employed in order to relay the transmissions. It should be noted that this description describes the invention primarily in the context of an application wherein only a single remote transceiver (e.g., remote transceiver 4a) is employed to facilitate communication between at least one of the tags 5a1–5xx and the master transceiver 3. It also should be noted that, for the case in which a tag (e.g., tag 5a1) is able to communicate directly with the master transceiver 3, no remote transceivers 4a–4n need be employed in order to relay the communications.

Figure 3:
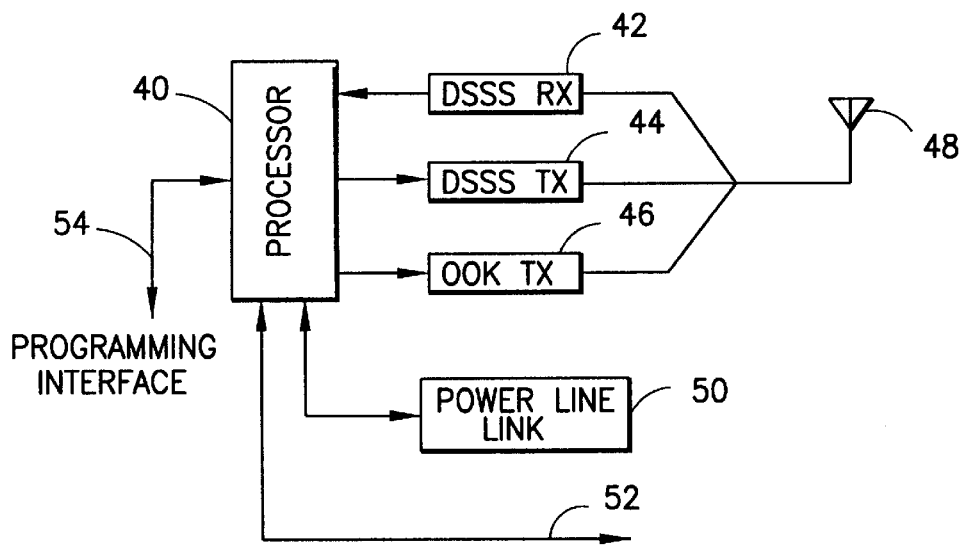
FIG. 3 illustrates a receiver portion of a transceiver that is constructed in accordance with a preferred embodiment of the random interval inventory system of FIG. 1.

In accordance with one alternate embodiment of this invention, the remote transceivers 4a–4n inter-communicate with one another and/or with the master transceiver 3 via AC power lines. FIG. 3 illustrates a power line link 50 for a remote transceiver 4a–4n (or a master transceiver 3).

FIG. 3 illustrates a block diagram of a transceiver which may function as a master transceiver 3 or one of the remote transceivers 4a–4n, and which is constructed in accordance with various embodiments of the invention. An antenna 48 (which forms antenna 3a for a master transceiver or antennas 4a1–4n1 for the respective remote transceivers), is coupled to a Direct Sequence Spread Spectrum receiver (DSSS RX) block 42, a DSSS transmitter (DSSS TX) block 44, and an "ON-OFF" key transmitter (OOK TX) block 46. The DSSS RX block 42 is employed in all embodiments of the invention for receiving signals from tags 5ax–5xx, other remote transceivers 4a–4n, and the master transceiver 3. The DSSS RX block 42 employs a known type of Direct Sequence Spread Spectrum technique for receiving signals. When a signal is received by the transceiver via antenna 48, the signal is provided to the DSSS RX block 42 wherein it is decoded and checked for errors. Signals that are received with errors from tags 5a1–5xx are ignored. Signals received by a remote transceiver 4a from the master transceiver 3 are error-checked. If the signal is received without error, the remote transceiver 4a responds back to the master receiver 3 with a verification signal. If there is no verification signal received by the master transceiver 3, the master transceiver transmits again, with a random delay determined by the processor 40 of the master transceiver 3, which handles appropriate protocol functions. It should be noted that a situation in which the master transceiver 3 transmits signals to remote transceivers 4a–4n is addressed below with respect to an embodiment of the invention employing data reduction.

The DSSS TX block 44 is employed to transmit, in response to a signal received from the processor 40, signals using a DSSS technique. Signals provided from the DSSS TX block 44 are transmitted via the antenna 48 to other ones of the remote transceivers 4a–4n, or to the master transceiver 3, as is required by the application of interest. The DSSS TX block 44 is primarily employed in the first embodiment of the invention, and in the second embodiment of the invention which will be described below.

The OOK TX block 46 is employed (in lieu of the DSSS TX block 44) in an embodiment of the invention employing receive/transmit (RX/TX) tags, which also will be described below. In the RX/TX embodiment, the OOK TX block 46 is used for transmitting signals to the RX/TX tags.

Depending upon the range being transmitted over, the antenna 48 can be, for example, an omni-directional antenna with low gain, or a high gain, directional antenna (which will increase transmission range approximately 2–3 times) where appropriate. Also, similar to the tags 5a1–5XX, each transceiver has a user-interface 54 for programming information into the transceiver.

In accordance with the embodiment of the invention wherein AC power lines are used to facilitate communications between, by example, remote transceivers 4a–4n and/or between a remote transceiver 4a and the master transceiver 3, power line link block 50 is employed instead of the DSSS TX block 44.

Also illustrated in FIG. 3 is an interface link 52 which is used in a master transceiver 3 to interface with the security console 2, or to a pager system.

Having described in detail the operations and construction of the transceiver illustrated in FIG. 3, the operation of the RIIS 1 will now be further discussed. After a signal is received by the master receiver 3, it is forwarded to the security console 2 wherein the signal is recognized as corresponding to a portion of the information stored within the security console 2. More particularly, information stored within the security console 2 corresponds to the bits of information transmitted by each tag 5a1–5xx. As such, when the security console 2 receives a confidence signal from one of the tags (e.g., tag 5a1) that is mounted on a particular painting, and thereafter recognizes the received information as corresponding to information stored within the security console 2, it is confirmed that the particular painting is present in the art gallery. In this manner, the painting is inventoried.

The second mode in which the tags 5a1–5xx operate is deemed, for the purposes of this description, to be a "panic mode". This operating mode is useful for tracking the movement of items, and for identifying an occurrence of a specified event, such as, for example, the removal of a painting from its assigned location within the art gallery, or the reaching of a specified temperature within the art gallery environment. The panic mode is implemented in a manner that is made apparent by the following example. Referring to FIG. 2, "bump monitor" sensor 12 associated with a tag (e.g., tag 5a1) senses the movement of a painting (which may indicate, for example, the removal of the painting from its assigned location within the art gallery). The sensor 12, which may be, by example, an accelerometer, a motion-sensitive switch, a temperature sensor, etc., supplies information representing the occurrence of the specified event to the controller 10 which, in response, emits control signals at second random time intervals. The second random time intervals are based upon a second average time interval. The second average time interval is predetermined by, for example, a user entering information into the controller 10 via the user interface 13 for specifying an approximate average frequency (e.g., every 1 second, or every 15 seconds) at which it is desired to be notified of distress signals once the specified event has been detected. Each control signal is mixed at modulator 15 with a carrier signal generated by local oscillator 18 and amplified by amplifier 16 in the same manner as described above for the confidence mode. Then, the signal is transmitted as a "distress" signal over antenna 22 to one of the remote transceivers (e.g., remote transceiver 4a). Thereafter the distress signal is relayed to the master transceiver 3, in the same manner as described above for the confidence mode. The master transceiver 3 then supplies the distress signal to the security console wherein it is determined that, based upon the frequency of reception of the distress signals with respect to that of the confidence signals, the specified event (e.g., movement of the painting) has occurred. It should be noted that the second operating mode may also be invoked by the "over-temperature" monitoring sensor 14 associated with tag 5a1 sensing that a surrounding temperature has reached a predetermined "over-threshold" level, or by any other type of sensor interfaced with the tag 5a1 sensing an occurrence of a specified event. For the purposes of this invention, tags 5a1–5xx which are operating in the panic mode are deemed to be "active tags".

In accordance with the second embodiment of the invention, the second operating mode may also be invoked by a user operating, by example, the user interface 13 or a "panic" button (which may be coupled to, by example, the user interface 13) to indicate a personal distress alarm (PDA). For this embodiment, each tag 5a1–5xx is similar to the tags of the previously-discussed embodiment, with the addition of a power amplifier 17 interposed between the amplifier 16 and filter 19, as is illustrated in FIG. 2. Amplifier 17 is, by example, a 25 dBm amplifier. Additionally, the tags of this embodiment accommodate a larger battery and have higher transmit power/ERP which permits the probability of linking to the master receiver 3 to be increased. Moreover, the tags of this embodiment may be programmed to have different first and second average time intervals, a different "over-temperature" threshold, and different transmission responses to, by example, movement and/or temperature, than tags of the first embodiment. By example, a tag may be programmed to transmit a distress signal if sensor 12 detects no movement during a time when the painting associated with the tag is known to be experiencing movement, thus indicating, for example, that the tag has been removed from the painting. Furthermore in this embodiment, the master receiver 3 interfaces with a pager system (not illustrated) in lieu of, or in addition to the security console 2, such that when a PDA signal is received from a tag (e.g., tag 5a1), the master receiver 3 sends signals specifying, by example, a name or a message, to the pager system.

In another embodiment of the invention, the RIIS 1 performs tracking of the objects (e.g., paintings). The technique by which the RIIS 1 performs tracking of objects may be any technique known in the art for determining relative locations of objects based upon power measurements of signals received from transmitters located on or near the respective objects. The technique can be performed at, for example, the individual remote transceivers 4a–4n, the master transceiver 3, and/or the security console 2. By example, for a case in which the technique is performed at the security console 2, a first signal received by the security console 2 is measured to determine the received signal's strength. The determined signal strength is stored within the security console 2. Upon a receipt of a following second signal transmitted by the same tag, the security console 2 measures the signal strength of this second signal. Based upon the relative signal strengths of the first and second signals, a displacement of the tag and its associated painting occurring between the time when the first signal was transmitted and the time when the second signal was transmitted can be determined. A calculation can then be made to determine the location of the painting. The same process occurs for subsequently received signals. The process can also be carried out by comparing measured signal strengths of signals received from a tag with a reference signal strength transmitted by the tag when at its assigned location.

In another embodiment of the invention, the remote transceivers 4a–4n autonomously perform data reduction by identifying what information needs to be communicated to the master transceiver 3 (e.g., what has changed in the inventory or alarm status). This information is provided to the master transceiver 3 in response to a command received from the master transceiver 3 interrogating the remote transceivers 4a–4n to transmit inventory and alarm status signals. In this manner, as opposed to providing a complete list of all current inventory, the remote transceivers 4a–4n simply provide information indicating, by example, changes in alarm or inventory status. This protocol is applicable in applications using the transmit-only tags and the remote interrogators 4a–4n for facilitating communications (e.g., limited data loading) with the master transceiver 3.

In an exemplary situation, a change in status may be identified by the remote transceiver recognizing that a signal has not been received from a particular tag within a first predetermined time period. By example, after a signal is received by remote transceiver 4a from tag 5a1, an internal clock (not illustrated) within the remote transceiver 4a begins to run. If the time kept by the clock then exceeds the first predetermined time period stored within the remote transceiver 4a, a change in status is recognized by the remote transceiver 4a. The change in status may indicate, for example, that a painting to which tag 5a1 is affixed has been moved out of range of the remote transceiver 4a. The remote transceiver 4a stores information which indicates this change in status and which identifies the particular tag (and/or the painting to which it is affixed) from which the signal was originally transmitted.

It should be noted that these examples are intended to be exemplary in nature and not limiting in scope, and that other changes in status may be identified by a remote transceiver. For example, a remote transceiver can recognize that two signals received from a particular one of the tags have been received by the remote transceiver within a second predetermined time period (i.e., indicating the panic mode). Also, as described above, the remote transceiver may measure signal strengths of received signals in order to determine whether a painting has been displaced from an assigned or reference location.

As indicated above, the master transceiver 3 transmits commands to the remote transceivers 4a–4n in order to interrogate them for sending back status signals. This may occur at, for example, predetermined time intervals. Once a command signal transmitted by the master transceiver 3 is received by a remote transceiver (e.g., remote transceiver 4a), the remote transceiver 4a responds by transmitting stored information which indicates any changes in status and which identifies particular tags and/or paintings associated with those changes in status identified by the remote transceiver 4a since, by example, a last command was received by the master transceiver 3. Thereafter, the information is received by the master transceiver 3 and is then supplied to the security console 2 for notifying, by example, a user of the changes in status effecting the particular tag and/or painting identified by the information. In another embodiment, the remote interrogator 4a responds to commands received from the master transceiver 3 by providing the information indicating changes in status that have been identified and stored by the remote interrogator 4a over a predetermined time period.

Having described several embodiments of the invention, another aspect of the invention will now be discussed which applies to all of the embodiments of the invention, including those discussed below. For this aspect of the invention the manner in which signals are transmitted from each tag 5a1–5xx can be set to minimize the possibility that signals transmitted by more than one tag 5a1–5xx will be received simultaneously by the master transceiver 3. For example, this may be accomplished by operating the user interface or by using detections made by a sensor (e.g., sensor 12 and/or 14) of each tag 5a1–5xx to vary a seed value in order to specify a unique first and second average time interval for each tag 5a1–5xx. Also by example, this may be accomplished by varying the random timing variations (frequencies) of the clock 10a associated with each tag 5a1–5xx such that they differ from those of the other tags 5a1–5xx. As such, the probability that more than one tag 5a1–5xx will transmit simultaneously, and that the master transceiver 3 will simultaneously receive signals from more than one tag 5a1–5xx, is minimized. This can be further understood in consideration of the following probability equations.

The probability $P_{tx}$ that a particular one of the tags (e.g., tag 5a1) is transmitting at a particular time is represented by the equation:

$$P_{tx} = \left[ \frac{ton}{ton + toff} \right]$$

where:

$P_{tx}$ represents the probability that a particular tag (e.g., tag 5a1) is transmitting a signal; ton represents the duration of the transmission of a randomly occurring signal; and toff represents an average time interval between random transmissions.

The probability $P_{ntx}$ that a particular tag will not transmit a confidence signal at a particular time is represented by the equation:

$$P_{ntx} = 1 - \frac{ton}{ton + toff}$$

Where:

ton and toff represent the same information as defined above.

Based upon the foregoing equations, the probability $P_{tx}$ that one tag (e.g., tag 5a1) transmits a first confidence signal during a time at which no other tags (e.g., tags 5a2–5xx) are transmitting confidence signals, and hence the probability that the master transceiver 3 correctly receives the first confidence signal, is represented by the equation:

$$Ptx = \left[ 1 - \frac{ton}{toff + ton} \right]^n$$

where:

Ptx represents the probability that an individual transmitting tag (e.g., tag 5a1) is the only one of the tags 5a1–5xx that is transmitting a signal at a particular time; ton and toff have the same meanings as described above; and n represents the total number of tags (e.g., tags 5a2–5ax), not including a transmitting tag of interest (e.g., tag 5a1), that may be transmitting a signal at the same time as the transmitting tag 5a1.

Similarly, the probability Pm that a tag (e.g., tag 5a1) transmits at least one of m confidence signals during a time at which no other tags (e.g., tags 5a2–5xx) are transmitting confidence signals, and hence the probability that the master transceiver 3 correctly receives at least one confidence signal out of m transmitted confidence signals, is represented by the equation:

$$Pm = 1 - \left[1 - \left[1 - \frac{ton}{toff + ton}\right]^n\right]^m$$

Where:

n, ton, and toff have the same meanings as described above, and m represents the number of confidence signal transmissions made by a transmitting tag of interest (e.g., tag 5a1).

Figure 5:
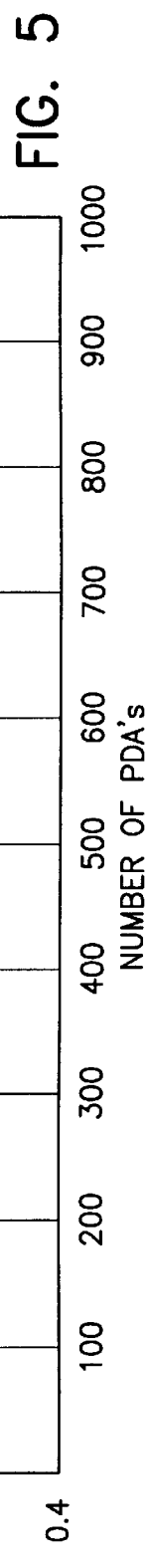
FIG. 5 illustrates a graph representing probabilities that none of a plurality of the tags of FIG. 2 are transmitting distress signals at any one time, for various numbers of tags randomly transmitting information signals based upon 15 second intervals.

It should be noted that in accordance with these equations, during a PDA the values of ton, toff and n are relatively smaller during the confidence mode. In light of the above probability analysis, it has been determined that where a substantial number (i.e., more than one thousand) of tags 5a1–5xx are employed in the RIIS 1, the probability that each tag 5a1–5xx will successfully link with the master transceiver 3 at any one time is substantial. FIGS. 5 to 12 illustrate probability graphs for various numbers of tags 5a1–5xx, data bit packets, and data bit rates. FIG. 5 illustrates a graph representing probabilities that no tags 5a1–5xx are transmitting distress signals at any one time, for a case wherein there are various numbers (0 to 1000) of tags 5a1–5xx randomly transmitting 12 bit packet, 1 kbps information signals based upon a second average time interval of 15 second duration.

Figure 6:
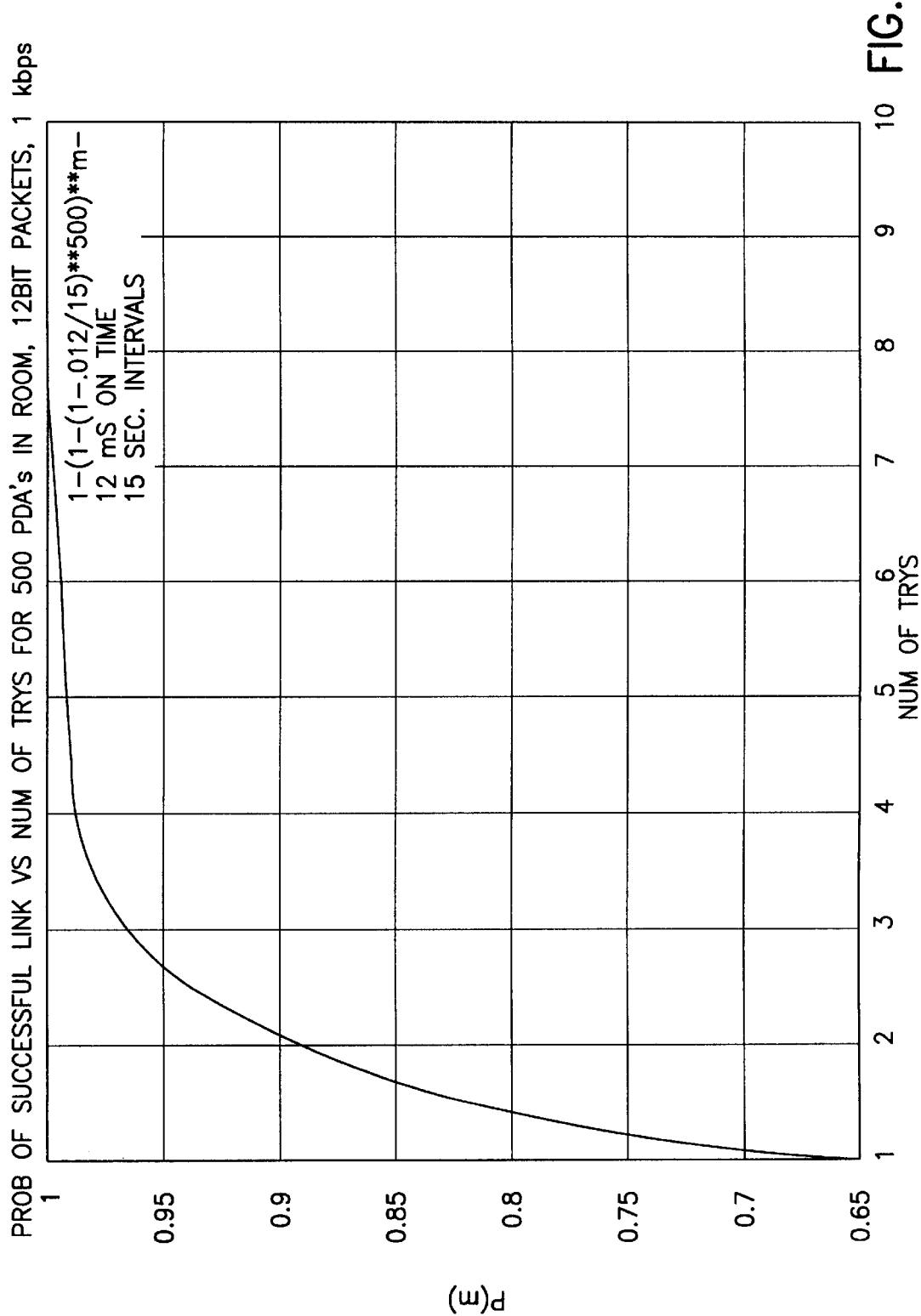
FIG. 6 illustrates a graph representing probabilities that a particular one of 500 of the tags of FIG. 2 will successfully communicate distress signals with the master transceiver of FIG. 3 per each of a number of random transmissions occurring based upon 15 second intervals.

FIG. 6 illustrates a graph representing probabilities that a particular one tag (e.g., tag 5a1) of 500 tags 5a1–5xx will successfully communicate 12 bit packet, 1 kbps distress signals with the master transceiver 3 per each of 10 successive random transmissions occurring based upon a second average time interval of 15 second duration.

Figure 7:
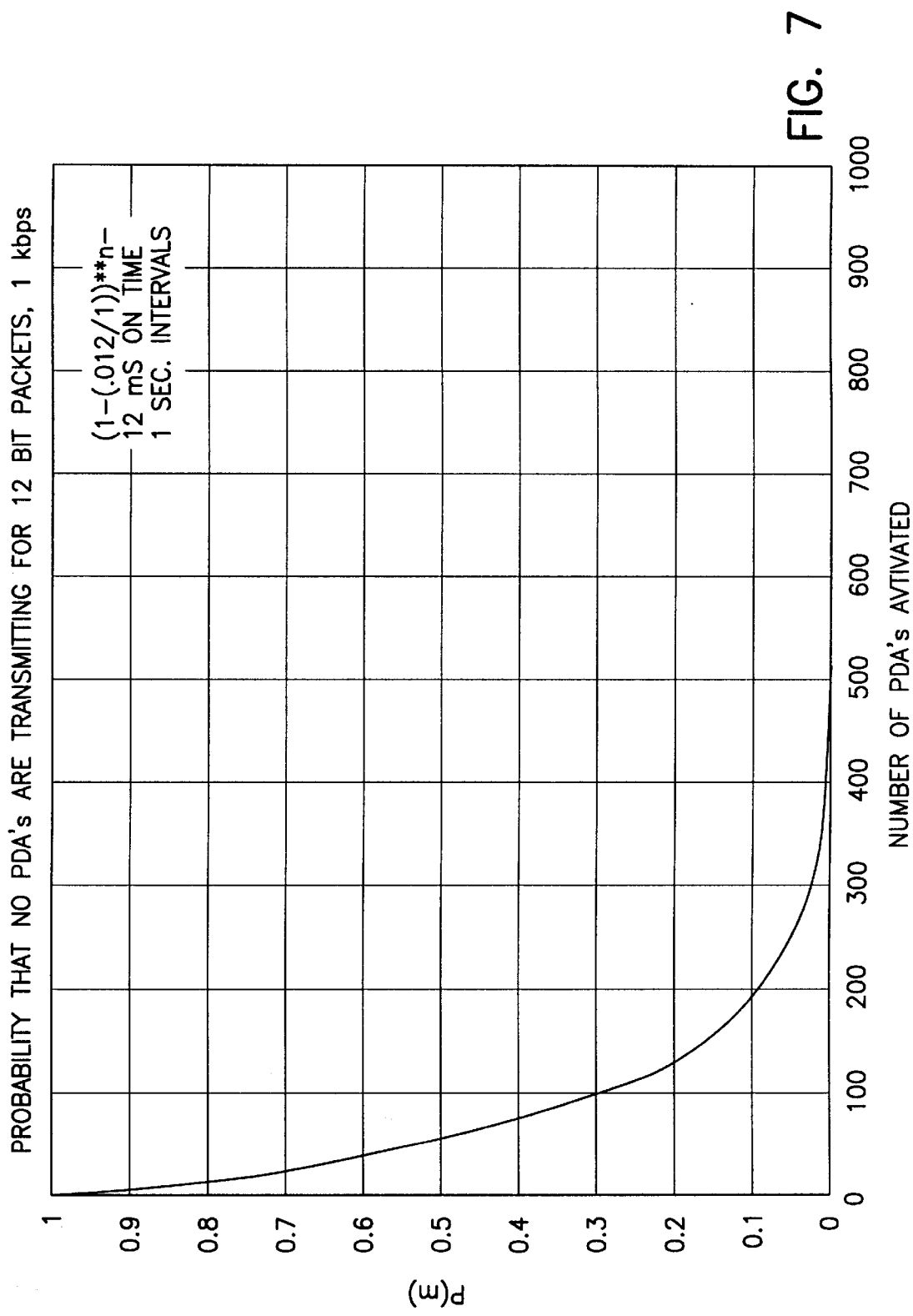
FIG. 7 illustrates a graph representing probabilities that no activated ones of a plurality of the tags of FIG. 2 are transmitting distress signals at any one time, for various numbers of tags randomly transmitting information signals based upon 1 second intervals.

FIG. 7 illustrates a graph representing probabilities that no activated ones of various numbers (0 to 1000) of tags 5a1–5xx are transmitting distress signals at any one time, for a case wherein the tags 5a1–5xx are randomly transmitting 12 bit packet, 1 kbps information signals based upon a second average time interval of 1 second duration.

Figure 8:
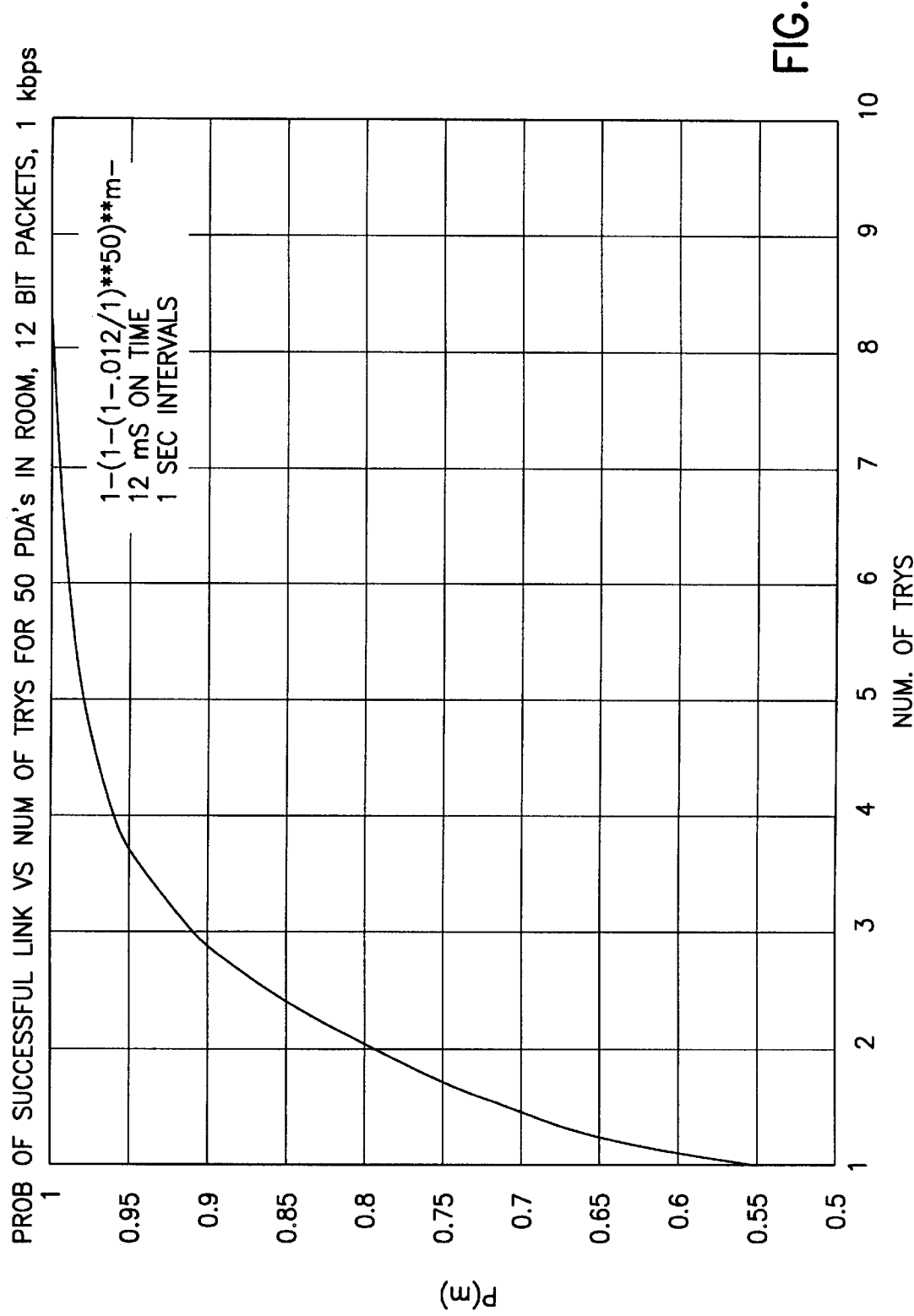
FIG. 8 illustrates a graph representing probabilities that a particular one of 50 of the tags of FIG. 2 will successfully communicate distress signals with the master transceiver of FIG. 3 per each of a number of transmissions, wherein each tag randomly transmits information signals based upon 1 second intervals.

FIG. 8 illustrates a graph representing probabilities that a particular one tag (e.g., tag 5a1) of 50 transmitting tags 5a1–5xx will successfully communicate 12 bit packet, 1 kbps distress signals with the master transceiver 3 per each of 10 successive transmissions, wherein each tag 5a1–5xx randomly transmits distress signals based upon a second average time interval of 1 second duration.

Figure 9:
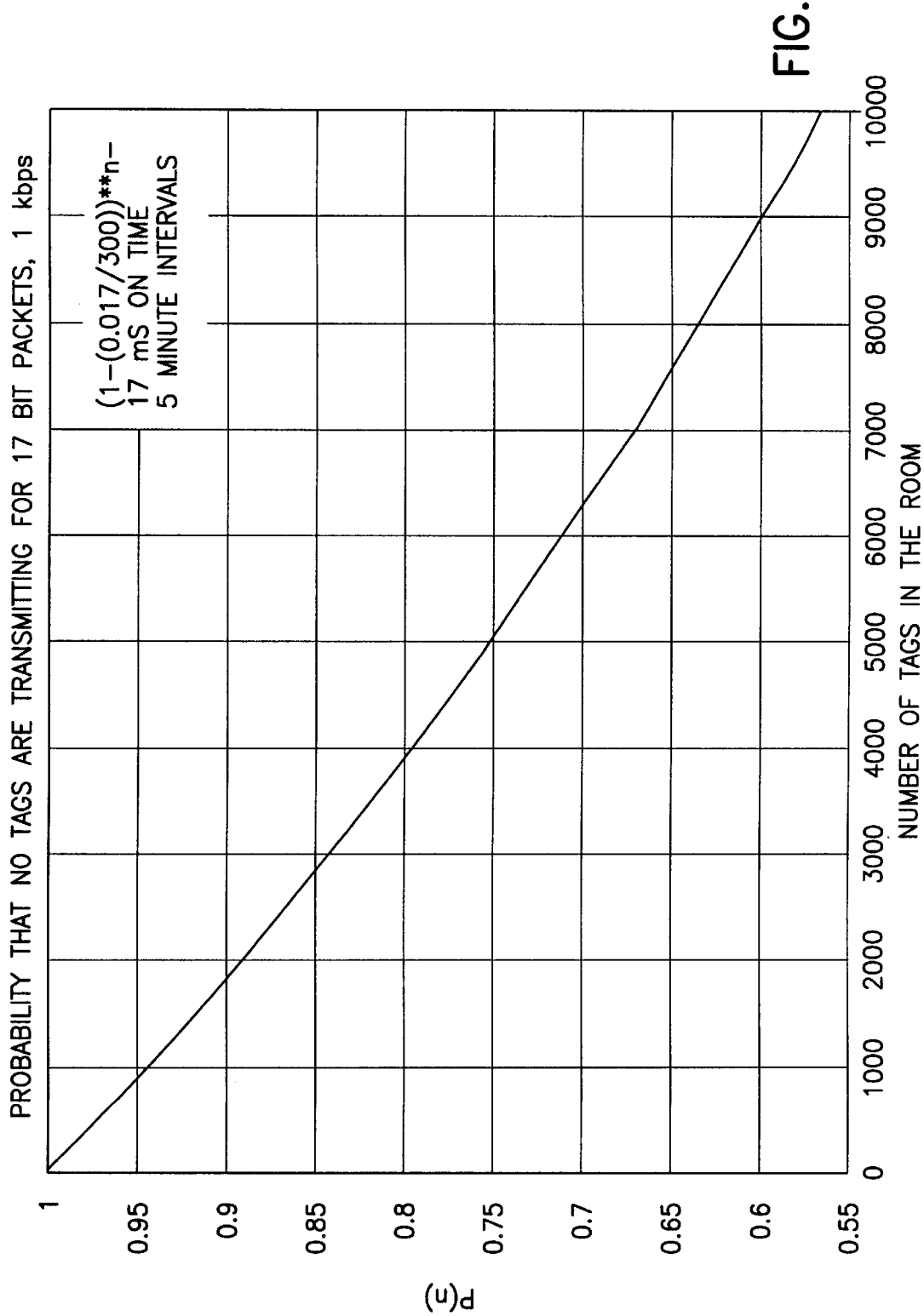
FIG. 9 illustrates a graph representing probabilities that none of a plurality of the tags of FIG. 2 are transmitting information signals at any one time during a confidence mode of operation, for various numbers of tags that are randomly transmitting information signals of 17 millisecond pulse duration, based upon 5 minute intervals.

FIG. 9 illustrates a graph representing probabilities that no tags 5a1–5xx are transmitting information signals at any one time while the tags 5a1–5xx are operating in the confidence mode, wherein there are various numbers (0 to 10000) of tags 5a1–5xx randomly transmitting 17 bit packet, 1 kbps information signals of 17 millisecond pulse duration, based upon a first average time interval of 5 minute duration.

Figure 10:
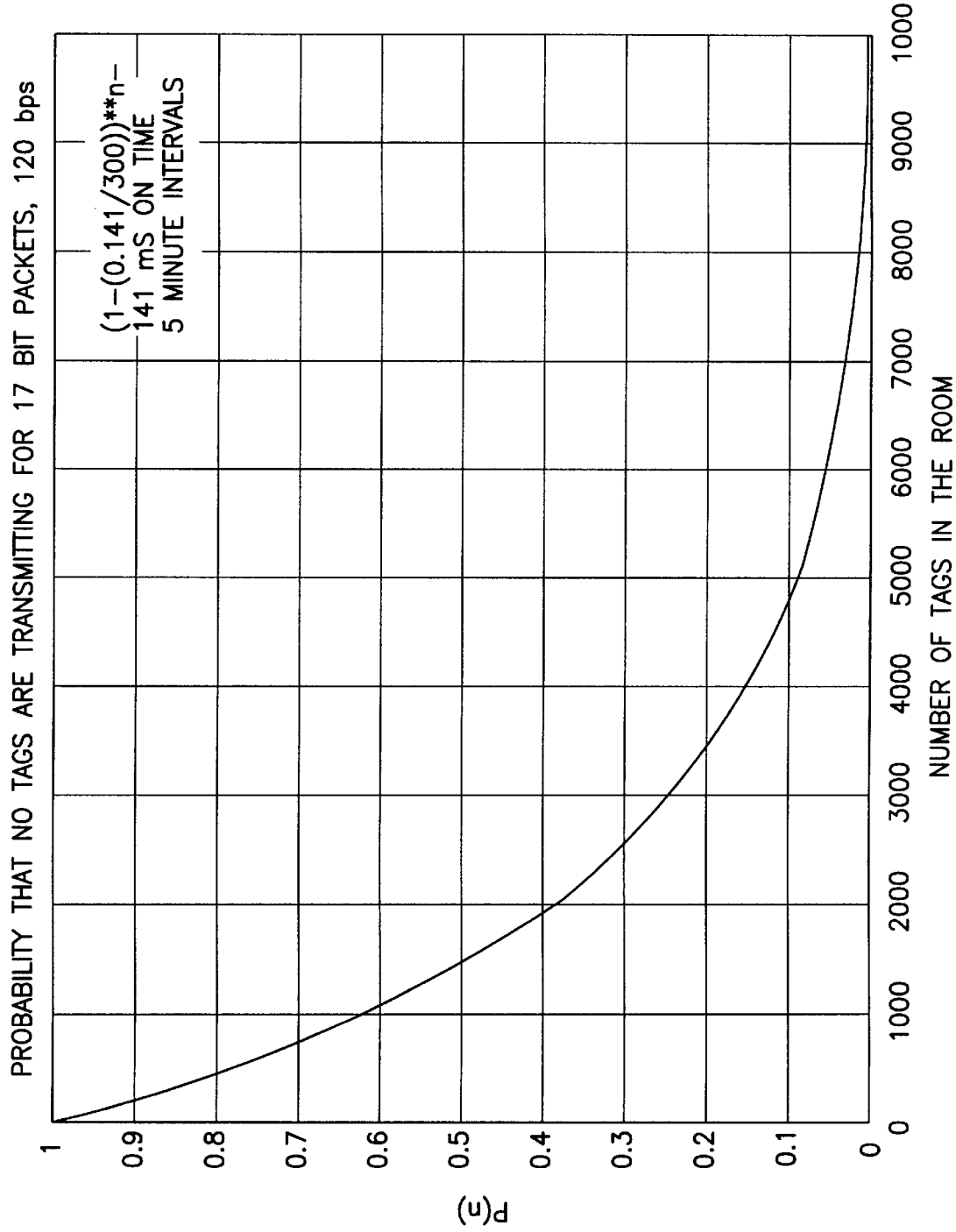
FIG. 10 illustrates a graph representing probabilities that none of a plurality of the tags of FIG. 2 are transmitting information signals at any one time, during a confidence mode of operation, for various numbers of tags that are randomly transmitting information signals of 141 millisecond pulse duration, based upon 5 minute intervals.

FIG. 10 illustrates a graph representing probabilities that no tags 5a1–5xx are transmitting information signals at any one time, during the confidence mode of operation, for various numbers (0 to 10000) of tags 5a1–5xx that are randomly transmitting 17 bit packet, 120 bps information signals of 141 millisecond pulse duration, based upon a first average time interval of 5 minutes.

Figure 11:
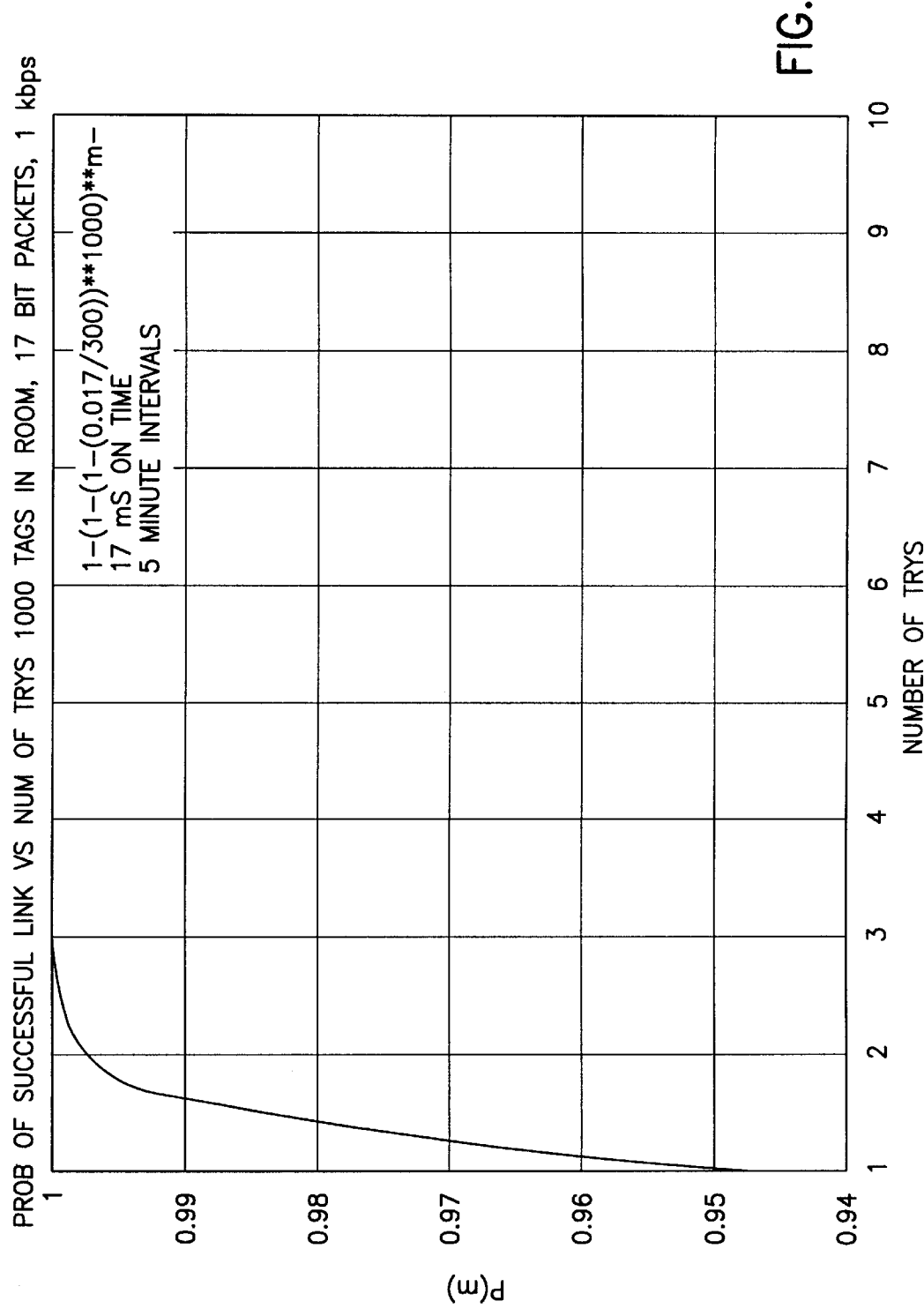
FIG. 11 illustrates a graph representing probabilities that a particular one of 1000 of the tags of FIG. 2 will successfully communicate 17 millisecond pulse duration information signals with the master transceiver of FIG. 3 per each of a number of random transmissions occurring based upon 5 minute intervals.

FIG. 11 illustrates a graph representing probabilities that a particular one tag (e.g., tag 5a1) of 1000 tags 5a1–5xx will successfully communicate 17 bit packet, 1 kbps, and 17 millisecond pulse duration information signals with the master transceiver 3 per each of 10 successive random transmissions occurring based upon a first average time interval of 5 minutes.

Figure 12:
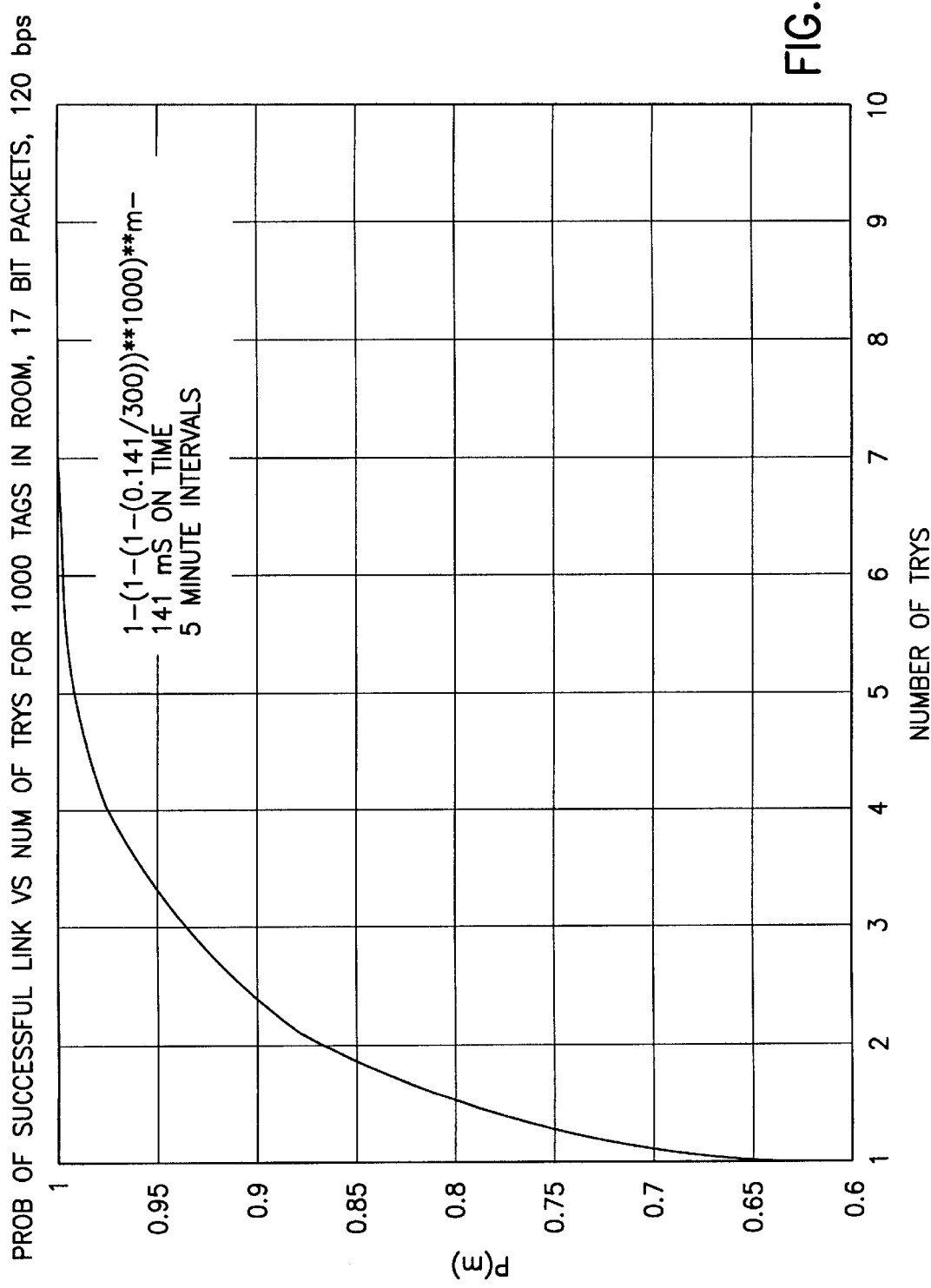
FIG. 12 illustrates a graph representing probabilities that a particular one of 1000 of the tags of FIG. 2 will successfully communicate 141 millisecond pulse duration information signals with the master transceiver of FIG. 3 per each of a number of random transmissions occurring based upon 5 minute intervals.

FIG. 12 illustrates a graph representing probabilities that a particular one tag (e.g., tag 5a1) of 1000 tags 5a1–5xx will successfully communicate 141 millisecond pulse duration information signals with the master transceiver 3 per each of 10 successive random transmissions occurring based upon a first average time interval of 5 minutes.

Having described embodiments of the invention for transmit-only tags, a further embodiment of the invention will now be described which employs receive/transmit (RX/TX) tags. For the purposes of this description, this further embodiment is referred to as a "Transmit-Then-Receive" (TTR) protocol embodiment wherein individual tags 5a1–5xx transmit signals at intervals to the master transceiver 3 or a remote interrogator (e.g., remote interrogator 4a) in order to perform an inventorying of items (e.g., a paintings) associated with the tags, in the same manner as was described above. However, for the TTR protocol embodiment each transmission is followed by a predetermined waiting period, during which the tag operates in a receive mode, instead of a transmit mode, for a predetermined time interval. Also, as described above, each of the master transceiver 3 and the remote transceivers 4a–4n comprises (in lieu of the DSSS TX block 44) the OOK TX block 46 which functions as described below. The OOK TX block 46 is a less complex system than the DSSS TX block 44.

Figure 4B:
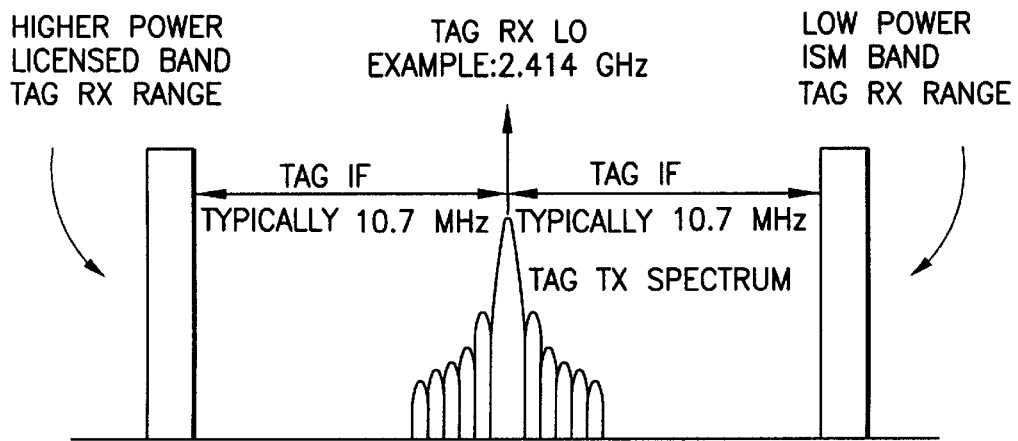
FIG. 4b is an illustration of a dual receive band tag scheme in accordance with the invention.
Figure 4C:
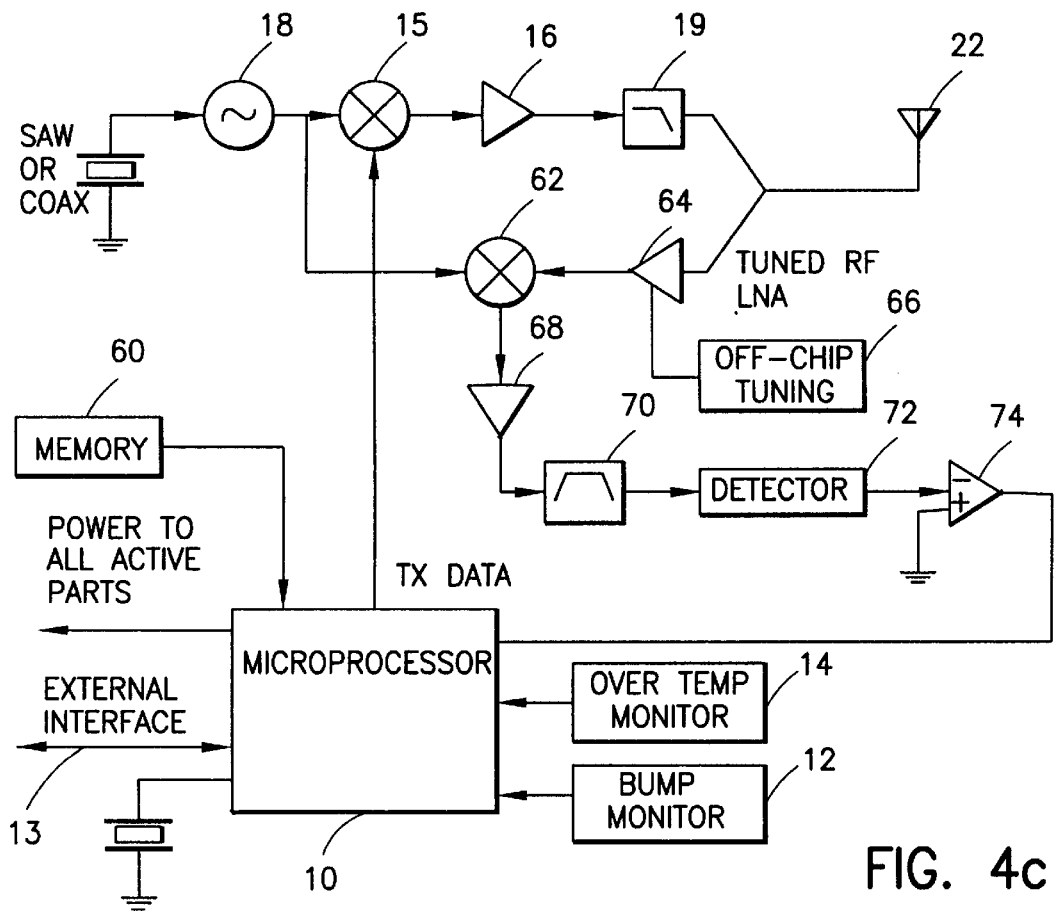
FIG. 4c is an illustration of a transmit/receive tag constructed in accordance with a further embodiment of the random interval inventory system of FIG. 1.

FIG. 4c illustrates an RX/TX tag constructed in accordance with a preferred embodiment of this invention. The RX/TX tag is similar to the transmit-only tag of the first embodiment of the invention in that it comprises a local oscillator 18, a modulator 15, an amplifier 16, a filter 19, a microprocessor controller 10, an "over-temperature" monitor sensor 14, a "bump" monitor sensor 12, an antenna 22, and an external user-interface 13. These elements function in a similar manner to the same elements of the transmit-only tag, although the controller 10 performs additional functions over that for the transmit-only tags. In addition to these elements, the RX/TX tag also comprises a larger memory (e.g., 1 to 100 kilobyte) 60 than the transmit-only tag (whose memory is not illustrated in FIG. 2) and circuitry, namely an OOK receiver circuit, enabling it to receive signals. By example, after a signal is transmitted from the RX/TX tag, the controller 10 controls the RX/TX tag to change its operating mode from the transmit mode to the receive mode for a time interval that is predetermined by, for example, information entered previously into controller 10 via the user-interface 13. The time interval is preferably a short time interval. First, an amplifier 64 has an input that is coupled to antenna 22 such that when the RX/TX tag is in a receive mode and a signal is received by the antenna 22, the signal is amplified to an appropriate level by amplifier 64. The amplifier 64 is tunable by an off-chip tuning block 66. A mixer 62 thereafter mixes the amplified signal with an output of local oscillator 18, whereafter the signal is amplified by amplifier 68 and thence filtered by a bandpass filter 70 (e.g., a 4.5 MHz IF bandpass filter). A detector circuit 72 detects an output of the filter 70 and thereafter provides a signal to a logic block 74 which is, by example, a comparator. The comparator 74 determines whether a signal received from the detector 72 is of a sufficient magnitude (e.g., above a noise level). If so, the comparator 74 provides a signal to the controller 10, which thereafter changes the operating mode to the transmit mode (i.e., the controller 10 "turns off" or "cycles-off" the receiver circuitry and "turns on" or "cycles-on" the transmitter circuitry). Having a receive capability, the RX/TX tag can have its parameters (e.g., an ID number, a bill of lading, and first and/or second average time intervals) programmed from a remote location, as will be described below.

In an exemplary application, after an individual one of the RX/TX tags (e.g., RX/TX tag 5a1) transmits a signal identifying the tag 5a1 at a first random time to, by example, one of the remote transceivers (e.g., remote transceiver 4a), the controller 10 controls the RX/TX tag to change its operating mode from the transmit mode to the receive mode as described above. Thereafter, the remote transceiver 4a receives the signal over antenna 48, which then provides the received signal to DSSS RX block 42, wherein appropriate receiving functions are performed to the signal (FIG. 3). After the signal passes through the DSSS RX block 42, the signal is provided to the processor 40. The processor 40 measures the frequency of the signal, which frequency was set originally at the transmitting RX/TX tag 5a1. This frequency measurement process occurs as a first step in the spread spectrum signal receive operation, and as such does not increase the complexity of the system. Following the frequency determination, the processor 40 controls the OOK TX block 46 to "cycle-on" so as to transmit a return data signal to the RX/TX tag 5a1 at a frequency that is offset from the measured frequency by a predetermined amount sufficient to optimize the performance of the RX/TX tag 5a1. The return data signal may carry information specifying, by example, a new first and/or second average time interval for the RX/TX tag 5a1, an identification number, or that the controller 10 of the RX/TX tag 5a1 shall cease the RX/TX tag 5a1 from making further transmissions. After the signal transmission by the remote transceiver 4a, the processor 40 controls the OOK TX block 46 to turn off. This frequency adjustment scheme allows for improved system characteristics such as, by example, a relatively simple, inexpensive tag Local Oscillator (LO), the minimization of tag IF bandwidth requirements (thereby maximizing sensitivity and operational range), and an inexpensive OOK style receiver.

Following a reception by the RX/TX tag 5a1 of the return signal transmitted from the remote transceiver 4a, the signal traverses the receiving circuitry in the manner described above, ultimately being provided to controller 10. Thereafter, the controller 10 changes the operating mode from the receive mode to the transmit mode, and performs an error check to determine whether the received signal carries error-free data. If it is determined that the return signal does carry error-free data, the tag may indicate same by transmitting an acknowledgement signal back to the remote interrogator 4a. If the controller 10 determines that erroneous data is received, the RX/TX tag 5a1 may transmit a signal to the remote transceiver 4a requesting a re-transmission, whereafter the remote transceiver 4a re-transmits the signal until the TX/RX tag 5a1 controller 10 determines that the signal has been received without error. If the RX/TX controller 10 continually finds an error in the signals received from remote interrogator 4a, and the RX/TX tag 5a1 transmits a re-transmission request signal to the remote transceiver 4a a predetermined number of times, the remote transceiver 4a transmits a signal back to the master transceiver 3 indicating failure.

It should be noted that this application is intended to be exemplary and not limiting in scope to the invention. For instance, the master transceiver 3 can function in the same manner as described above for the remote interrogator 4a. Moreover, although the application is described in the context in which the remote interrogator 4a sends a response signal to the RX/TX tag 5a1, in some applications it may not be necessary to send a response signal. By example, data that is received without error need not be acknowledged back to the remote transceiver 4a.

It is desirable to have the RX/TX tags 5a1–5xx operate at a fixed frequency. For example, FIG. 4b illustrates a preferable approximate frequency (i.e., 2.414 GHz) of an RX tag local oscillator. FIG. 4b also shows possible receive band schemes for the RX/TX tag embodiment of the invention, including an ISM band for low power receive applications, and a higher-frequency licensed band for higher power applications.

In accordance with an aspect of this invention, because the tags transmit for short intervals, pause, and then change to a receive mode for a short interval, the tags operate in an energy-efficient manner.

While the invention has been particularly shown and described with respect to preferred embodiments thereof, it will be understood by those skilled in the art that changes in form and details may be made therein without departing from the scope and spirit of the invention.

What is claimed is:

1. A method for communicating between at least one transponder and a transceiving device, comprising the steps of:

providing the at least one transponder, said at least one transponder having a transmission operating mode and a reception operating mode, wherein while operating in the transmission operating mode said at least one transponder has a capability for transmitting signals, and while operating in said reception operating mode said at least one transponder has a capability for receiving signals;

while the at least one transponder operates in the transmission mode, transmitting a first signal from the at least one transponder to the transceiving device;

in response to the performance of the transmitting step, switching the operating mode of the transponder from the transmission operating mode to the reception operating mode and operating the at least one transponder in the reception operating mode for a predetermined time period;

receiving the first signal at the transceiving device;

sending a second signal from the transceiving device to the at least one transponder;

receiving the second signal at the at least one transponder within a duration of the predetermined time period; and in response to an expiration of the predetermined time period, switching the operating mode of the at least one transponder from the reception operating mode to the transmission operating mode.

2. A method as set forth in claim 1, wherein in response to the transceiving device receiving the first signal, the transceiving device performs the steps of:

determining a frequency of the received first signal to obtain a measured frequency of the first signal; and wherein the second signal has a frequency that is offset from the measured frequency by a predetermined amount.

3. A method as set forth in claim 2, wherein after receiving the second signal, the at least one transponder error checks the second signal, and, after the operating mode of the at least one transponder has been switched to the transmission operating mode, the at least one transponder transmits a third signal to the transceiving device indicating whether or not an error has been detected during the reception of second signal.

4. A method for communicating between at least one transmitter, at least one first transceiver, and a second, master transceiver, the at least one transmitter transmitting information signals to the at least one first transceiver, comprising the steps of:

within the at least one first transceiver, setting a timer to run in response to receiving a first one of the information signals from the at least one transmitter;

storing within the at least one first transceiver information which indicates an alarm status in response to one of: (1) the timer reaching a first predetermined time value before a second one of the information signals is received by the at least one first transceiver from the at least one transmitter and (2) a second one of the information signals being received by the at least one first transceiver prior to the timer reaching a second predetermined time value;

communicating an interrogation command from the second, master transceiver to the at least one first transceiver; and in response to the at least one first transceiver receiving the interrogation command, communicating the stored information from the at least one first transceiver to the second, master transceiver.

5. A method for reporting an occurrence of a condition affecting an individual one of a plurality of transmitter tags, the individual transmitter tags transmitting information signals in a predefined manner to at least one remote transceiver, the information signals transmitted from the individual transmitter tags corresponding to respective ones of a plurality of items with which the respective transmitter tags are associated, comprising the steps of:

recognizing the occurrence of a condition affecting an individual one of the transmitter tags by detecting that information signals received by the at least one remote transceiver from the individual transmitter tag have different strengths; and notifying a master transceiver that the condition affecting the individual transmitter tag has occurred in response to the at least one remote transceiver receiving an interrogation command from the master transceiver.

6. A method as set forth in claim 5, wherein a further step is performed of notifying a user of the occurrence of the condition.

7. A receive/transmit (RX/TX) tag, comprising:

a controller;

a receiver portion; and a transmitter portion, said controller being coupled to each of said receiver portion and said transmitter portion, wherein said controller controls an operating mode of said RX/TX tag, wherein in a first, transmission operating mode of said RX/TX tag, said transmitter portion is turned on and said receiver portion is turned off under the control of said controller, wherein in the first, transmission operating mode, said transmitter is controllable by said controller for transmitting a signal from the RX/TX tag, wherein after the signal is transmitted from said RX/TX tag said controller turns off said transmitter portion for a predetermined time period and turns on said receiver portion for the predetermined time period for causing the RX/TX tag to operate in a second, reception operating mode for the predetermined time period, wherein said controller is responsive to an expiration of said predetermined time period for again turning on said transmitter portion and turning off said receiver portion for causing the RX/TX tag to again operate in the first, transmission operating mode.

8. A communication system, comprising:

a receive/transmit (RX/TX) tag comprising means for transmitting signals, a receiver, and a controller, said controller being coupled to each of said signal transmitting means and said receiver, said controller for controlling an operating mode of said RX/TX tag, wherein in a first, transmission operating mode of said RX/TX tag, said signal transmitting means is turned on and said receiver is turned off under the control of said controller, wherein in the first, transmission operating mode, said signal transmitting means is controllable by the controller for transmitting a signal from the RX/TX tag, wherein after the signal is transmitted from said RX/TX tag said controller turns off said signal transmitting means for a predetermined time period and turns on said receiver for the predetermined time period for causing the RX/TX tag to operate in a second, reception operating mode for the predetermined time period, wherein said controller is responsive to an expiration of said predetermined time period for again turning on said signal transmitting means and turning off said receiver for causing the RX/TX tag to again operate in the first, transmission operating mode; and at least one transceiver, said at least one transceiver for receiving said signal from said RX/TX tag, and for transmitting, in response thereto, a response signal to said RX/TX tag such that the response signal is received by said RX/TX tag within the predetermined time period.

9. A communication system as set forth in claim 8, wherein said at least one transceiver comprises an On-Off Key (OOK) transmitter, and wherein said receiver of said RX/TX tag is an OOK receiver.

10. A communication system as set forth in claim 9, wherein said OOK transmitter turns off after said response signal is transmitted from said at least one transceiver.

11. A communication system as set forth in claim 8, wherein said at least one transceiver comprises:

means for measuring a frequency of said signal received from said RX/TX tag to obtain a measured frequency, wherein said response signal has a frequency that is offset from the measured frequency by a predetermined amount.

12. A communication system as set forth in claim 8, wherein the response signal includes information specifying that the RX/TX tag cease transmitting further signals.

13. A communication system as set forth in claim 8, wherein the response signal includes information specifying that the RX/TX tag transmit signals at random times which occur within respective ones of a plurality of successive predetermined time intervals.

14. A communication system as set forth in claim 8, wherein said receiver is responsive to receiving said response signal for outputting the response signal to said controller, said controller being responsive to receiving the response signal for error checking the response signal to determine if the response signal includes error free data, wherein if the controller determines that the response signal includes error free data, the controller controls said signal transmitting means for sending an acknowledgement signal to said at least one transceiver, after said RX/TX tag is caused to again operate in said first, transmission operating mode.

15. A communication system as set forth in claim 14, wherein the controller is responsive to determining that the response signal does not include error free data for controlling said signal transmitting means for sending a request signal to said at least one transceiver after said RX/TX tag is caused to again operate in said first, transmission operating mode, said request signal requesting that the at least one transceiver retransmit said response signal.

16. A communication system as set forth in claim 15, and further comprising a master receiver station, wherein the at least one transceiver is responsive to receiving a predetermined number of said request signals for transmitting a failure signal to said master receiver station.

17. A communication system, comprising:
a plurality of tags, individual ones of said plurality of tags for transmitting information signals in a predefined manner, said information signals transmitted from said individual ones of said plurality of tags corresponding to respective ones of a plurality of items;
at least one remote transceiver, said at least one remote transceiver for recognizing an occurrence of a condition affecting individual ones of the tags by detecting that information signals received by the at least one remote transceiver from individual ones of the tags have different strengths; and
at least one master transceiver for providing an interrogation command to said at least one remote transceiver, wherein said at least one remote transceiver responds to the interrogation command received from said at least one master receiver by notifying said at least one master transceiver of the occurrence of the condition affecting said individual ones of the tags.

18. A method for accounting for individual ones of a plurality of items, comprising the steps of:
transmitting information signals from individual ones of a plurality of transmitter tags to a receiving device, the transmissions of the information signals occurring at random times within respective ones of a plurality of successive first predetermined time intervals, the individual ones of the plurality of transmitter tags being affixed to respective individual ones of the plurality of items, the information signals transmitted from the individual transmitter tags corresponding at least to the respective items to which the transmitter tags are affixed;
in response to an input signal applied to at least one of the transmitter tags, transmitting the information signals from the at least one transmitter tag to the receiving device at random times within respective ones of a plurality of successive second predetermined time intervals; wherein within the receiving device, in response to receiving individual ones of the information signals, confirming that the items corresponding to the information signals are accounted for, and, detecting a variation in a rate at which the information signals are received from the at least one transmitter tag; and
wherein a probability that an individual one of the plurality of transmitter tags will transmit an information signal at a time when none of the other ones of the plurality of transmitter tags are transmitting information signals is represented by Ptx, where:

$$Ptx = \left[1 - \frac{ton}{toff + ton}\right]^n;$$

and where: ton represents a duration of an information signal transmission; toff represents an average time interval between chronological information signal transmissions of interest; and n represents the number of the other ones of the plurality of transmitter tags.

19. A method for accounting for individual ones of a plurality of items, comprising the steps of:
transmitting information signals from individual ones of a plurality of transmitter tags to a receiving device, the transmissions of the information signals occurring at random times within respective ones of a plurality of successive first predetermined time intervals, the individual ones of the plurality of transmitter tags being affixed to respective individual ones of the plurality of items, the information signals transmitted from the individual transmitter tags corresponding at least to the respective items to which the transmitter tags are affixed;
in response to an input signal applied to at least one of the transmitter tags, transmitting the information signals from the at least one transmitter tag to the receiving device at random times within respective ones of a plurality of successive second predetermined time intervals; wherein within the receiving device, in response to receiving individual ones of the information signals, confirming that the items corresponding to the information signals are accounted for, and, detecting a variation in a rate at which the information signals are received from the at least one transmitter tag; and
wherein a probability that an individual one of the plurality of transmitter tags will transmit an information signal during a period of time when none of the other ones of the plurality of transmitter tags are transmitting information signals is represented by n, where:

$$Pm = 1 - \left[1 - \left[1 - \frac{ton}{toff + ton}\right]^n\right]^m$$

and where: m represents a number of transmissions attempted during the time period; ton represents a duration of an information signal transmission; toff represents an average time interval between chronological information signal transmissions of interest; and n represents the number of the other ones of the plurality of transmitter tags.

20. A method for accounting for individual ones of a plurality of items, comprising the steps of:
transmitting information signals from individual ones of a plurality of transmitter tags to a receiving device, the transmissions of the information signals occurring at random times within respective ones of a plurality of successive first predetermined time intervals, the individual ones of the plurality of transmitter tags being affixed to respective individual ones of the plurality of items, the information signals transmitted from the individual transmitter tags corresponding at least to the respective items to which the transmitter tags are affixed;
in response to an input signal applied to at least one of the transmitter tags, transmitting the information signals from the at least one transmitter tag to the receiving device at random times within respective ones of a plurality of successive second predetermined time intervals; wherein within the receiving device, in response to receiving individual ones of the information signals, confirming that the items corresponding to the information signals are accounted for, and, detecting a variation in a rate at which the information signals are received from the at least one transmitter tag; and
further comprising the step of:
within the receiving device, in response to receiving a pair of at least one of the first and second information signals originally transmitted from an individual one of the transmitter tags, measuring the strength of each of the pair of said at least one of the first and second information signals; and
based upon a relationship between the measured strengths of each of said pair of said at least one of said first and second information signals, determining at least one of a location of an item to which the transmitter tag is affixed and a displacement of the item from a reference location.

* * * * *